July 7, 1959  F. W. FISCHER  2,893,580
BOAT TRAILER

Filed May 9, 1956  2 Sheets-Sheet 1

INVENTOR
FALTON FISCHER

BY
*Young & Wright*
ATTORNEYS

July 7, 1959  F. W. FISCHER  2,893,580
BOAT TRAILER
Filed May 9, 1956  2 Sheets-Sheet 2
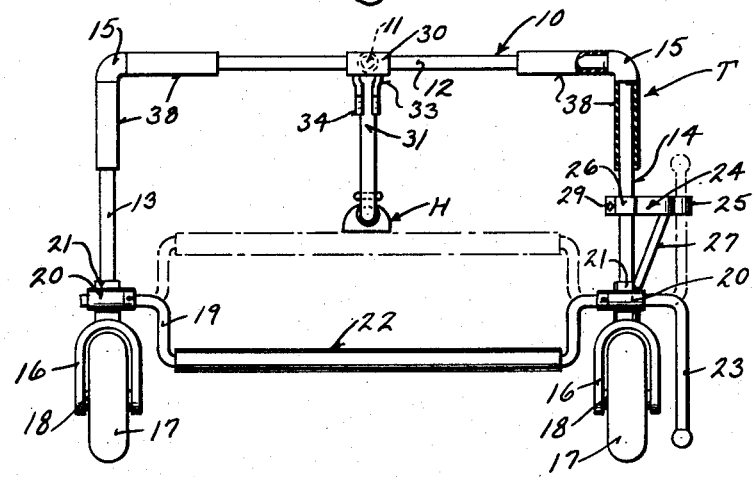
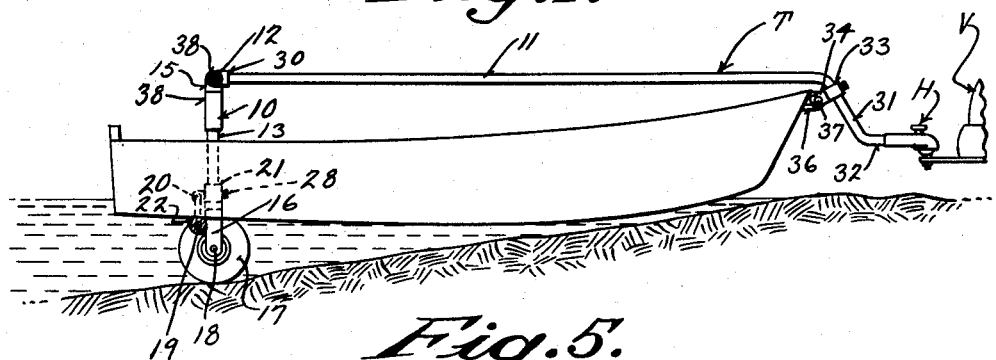
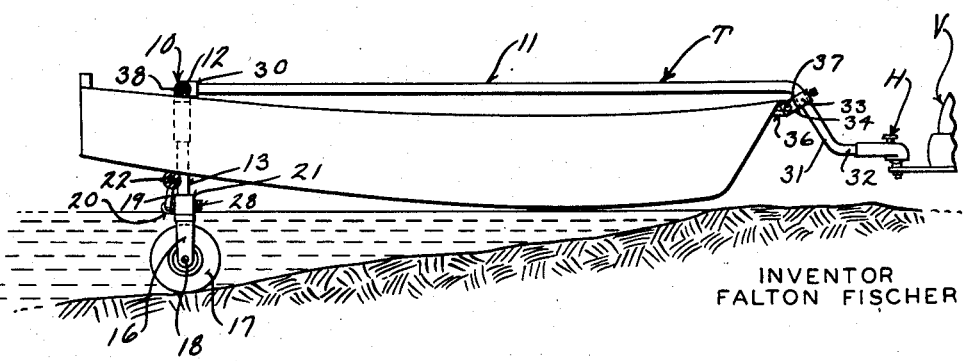
INVENTOR
FALTON FISCHER
BY
*Young and Wright*
ATTORNEYS United States Patent Office
2,893,580
Patented July 7, 1959

2,893,580

BOAT TRAILER

Falton W. Fischer, Oconto Falls, Wis.

Application May 9, 1956, Serial No. 583,698

1 Claim. (Cl. 214—394)

This invention appertains to trailers and more particularly to a novel trailer for transporting small boats of the row or outboard motor type.

One of the primary objects of my invention is to provide a trailer in which the boat can be easily and quickly slid on and off thereof without lifting or with a minimum amount of lifting and firmly locked on the trailer in an elevated position after the boat is placed on the trailer for transportation.

Another salient object of my invention is to provide a trailer which can be conveniently moved to the water's edge, so that the boat can be readily slid directly in the water from the trailer or placed in the trailer from the water.

A further object of my invention is to provide a trailer embodying a transversely extending, inverted U-shape frame for straddling a boat and a forwardly extending longitudinally disposed frame or reach pole for connection with the hitch of a pulling vehicle, the transverse frame carrying for turning movement, a supporting bar of a crank shape for movement to a lowered position for facilitating the sliding of a boat thereon and movable to a raised position for elevating the boat above the roadway for transporting and for firmly clamping the boat therebetween and the upper portion of the transverse frame.

A further important object of my invention is to provide novel means for connecting the bow of the boat to the forward end of the center frame or reach pole, whereby the boat can swing relative to the trailer incident to the raising and lowering of the boat to a loading or unloading position and to a transporting position.

A still further object of my invention is to provide novel means for turning the crank shaped supporting bar to a raised or lowered position and for holding the supporting bar against turning movement when the same is in its raised boat clamping position.

A still further important object of my invention is to provide a boat trailer of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawings, in which drawings, Figure 1 is a perspective view of my improved trailer showing the crank shaped supporting bar in its lowered boat receiving position;

Figure 3 is a rear elevational view of the trailer with parts thereof broken away and in section, the supporting bar being shown in its lowered position in full lines and in its raised boat clamping position in dotted lines;

Figure 4 is a longitudinal sectional view through the trailer showing the same attached to a pulling vehicle and pushed into the water with a boat slid into the trailer, and Figure 5 is a view similar to Figure 4, but showing the supporting bar in its raised position for firmly clamping the boat on the trailer.

Referring to the drawings in detail, wherein similar reference characters designate corresponding parts throughout the several views the letter T generally indicates my improved trailer and V a pulling vehicle.

Figure 1:
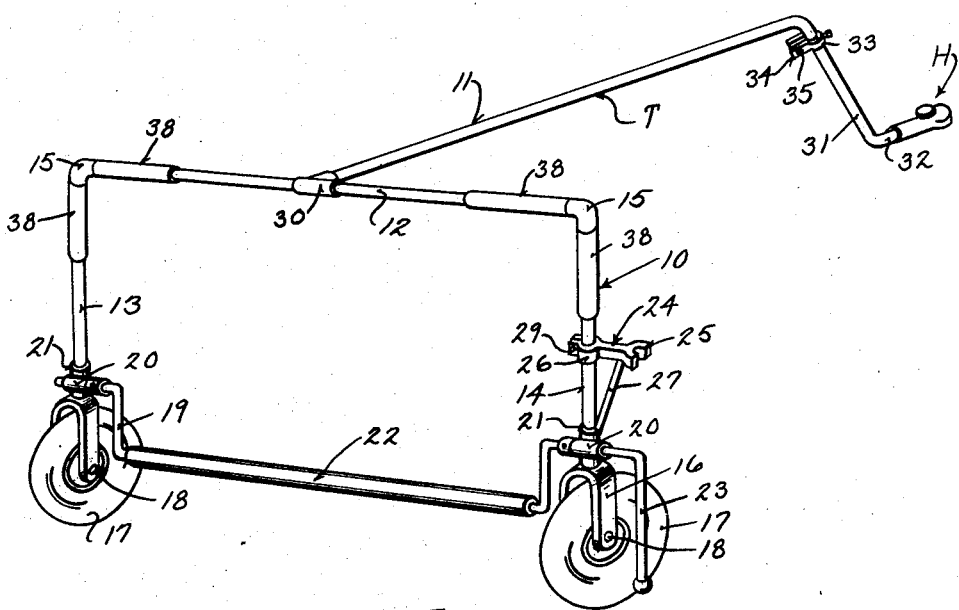
Figure 2:
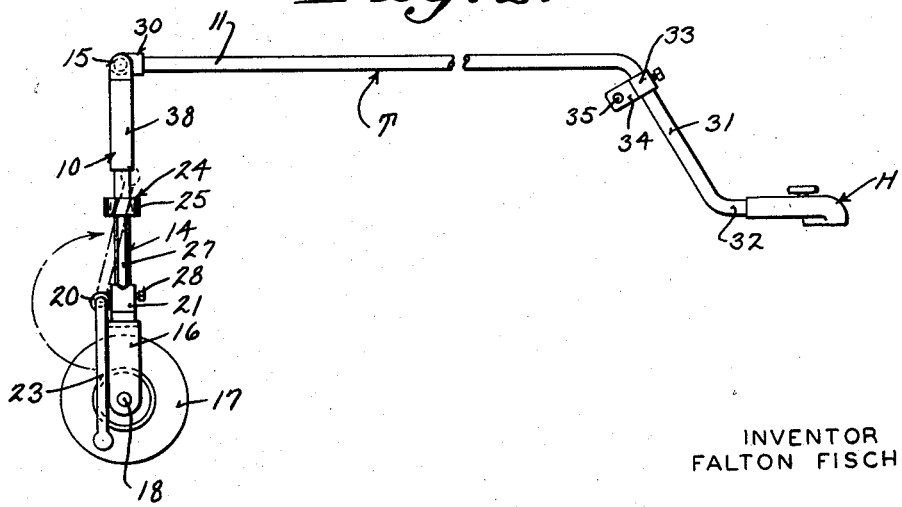
Figure 2 is a side elevational view of the trailer with the supporting bar in its lowered position, the view showing in dotted lines the operating handle for the supporting bar in its raised locked position.

The pulling vehicle V forms no part of my invention and only a fragment thereof has been shown to illustrate the connection of the trailer T therewith. The vehicle V carries one part of a hitch and the trailer T carries the companion part of the hitch (indicated by the reference character H). Obviously, the hitch per se forms no part of the present invention and can be of any desired type now found on the open market.

The trailer T comprises a transversely extending main frame 10, and a forwardly extending centrally disposed frame or reach pole 11.

The transversely extending frame 10 can be fabricated in different manners, and can be formed from sections of tubing, as illustrated in the drawings. This frame 10 includes a top frame bar 12 and depending side legs 13 and 14. The upper ends of the legs can be connected to the top bar 12 by means of elbow couplings 15. The lower terminals of the legs 13 and 14 have connected thereto yokes 16 and these yokes receive the ground wheels 17. The wheels are rotatably mounted on axles 18 carried by the yokes.

Forming a part of the transversely extending frame 10 is a lower crank shaped supporting bar 19 and the terminals of this supporting bar are rotatably mounted in bearing sleeves 20 formed on or welded to cuffs 21 mounted on the legs 13 and 14. Consequently, the supporting bar can be turned to bring the crank portion thereof toward and away from the top frame bar 12. The crank portion of the lower supporting bar 19 carries a roller sleeve 22 for facilitating the sliding of a boat on and off the trailer, as will later appear. One end of the crank shaped lower supporting bar 19 has formed thereon an operating handle or crank 23, and this facilitates the turning of the supporting bar to its raised and lowered position. Means is provided for locking the handle or crank 23 in its raised position so that accidental lowering movement of the supporting bar will be prevented when the supporting bar is in its raised boat clamping position. The holding or locking means for the handle 23 can consist of an arm 24 having its outer end provided with a U-shaped retaining fork 25 in which the handle or crank is sprung. The inner end of the arm 24 carries a split cuff 26 for embracing the leg 14 of the transverse frame. The arm 24 is rigidly connected to the cuff 21 carried by the leg 14 by means of a brace strut 27. In actual practice, the cuffs 21 and the split cuff 26 are slidable on the legs 13 and 14 so that the crank shaped supporting bar 19 can be initially adjusted toward and away from the upper frame bar 12, so that different heights of boats can be accommodated. When the cuffs 21 are adjusted to a desired, selected position, the same can be firmly secured to the legs 13 and 14 in any desired way, such as by set screws 28. The split cuff 26 can be firmly clamped to the leg 14 by means of an adjusting bolt 29 passing through the aligned ears of the split cuff.

The center frame or reach pole 11 can also be formed from a length of tubing, if such is preferred, and the inner end of the pole 11 is connected to the center portion of the upper frame bar 12 by a T-coupling 30. The forward end of the pole 11 is bent downwardly and forwardly so as to extend over the bow of a boat, as at 31, and so that the pole will extend toward the section of the hitch carried by the pulling vehicle V. The extreme forward end of the reach pole is provided with a substantially straight forwardly extending portion 32 and this portion 32 carries the part of the hitch H for connection with the companion part of the hitch secured to the vehicle V.

The bow of the boat is connected to the reach pole 11 in a novel manner and the reach pole adjacent to the upper end of the forwardly and downwardly extending portion 31 has secured thereto a split cuff 33 which embraces the reach pole. The cuff includes spaced downwardly and inwardly extending ears 34 and these ears are provided with aligned openings 35. The bow of the boat itself has firmly and rigidly secured thereto an eye 36 and when the boat is being placed in the trailer the eye 36 is placed between the ears 34 and a pivot bolt 37 is passed through the aligned openings 35 and the eye for pivotally supporting the bow of the boat.

Now considering that the supporting bar 19 is in its lowered position and it is desired to load a boat thereon that is in the water. Then the trailer is backed into the water, as shown in Figure 4, and the boat is slid over the supporting bar 19, and this is facilitated by the roller 22. When the eye 36 reaches the split cuff 33 then the same is connected to the cuff by the pivot bolt 37 as heretofore stated. With the boat in this position, the crank handle 23 is raised and consequently the crank portion of the supporting bar 19 is also raised moving the stern of the boat to an elevated transporting position with the boat firmly clamped between the top bar 10 of the frame and the supporting bar 19. At this time, the crank handle 23 is sprung into and between the arms of the hold fork 25.

It is preferred to provide the transversely extending frame with resilient buffer and friction pads for engaging the boat so as to firmly hold the boat and to prevent injury thereto. As illustrated, this can consist of lengths of rubber tubing 38 slipped over the top frame bar 12 and the upper ends of the legs 13 and 14. If desired, the roller 22 can also be covered with resilient friction material.

From the foregoing description, it can be seen that I have provided an exceptionally simple yet durable trailer, in which a boat can be conveniently slid on and off of the same and firmly locked thereon in a raised transporting position.

Changes in details may be made without departing from the spirit or the scope of this invention but what I claim as new is:

A trailer comprising a transversely extending main frame and a forwardly extending reach pole, the transversely extending frame being U-shaped and adapted to straddle a boat, said U-shaped main frame including an upper frame bar and depending side leg members, wheels carried by said side leg members, and a crank shaped lower supporting bar rotatably carried by the main frame and movable to a raised position toward the top frame bar for holding a boat in an elevated position therebetween, a roller sleeve carried by said crank portion of said supporting bar, a manipulating handle for turning the supporting bar to a raised and lowered position, and means carried by the forward end of the pole for pivotal connection with the bow of a boat, whereby, there are no frame or supporting members adjacent or under the sides or bottom of a boat held therein except said supporting bar and respective portions of said side leg members.

References Cited in the file of this patent
UNITED STATES PATENTS

| | | |
|---|---|---|
| 99,006 | Sack | Jan. 18, 1870 |
| 1,822,389 | Blakely | Sept. 8, 1931 |
| 2,388,870 | Sackett | Nov. 13, 1945 |
| 2,545,128 | Young | Mar. 13, 1951 |
| 2,586,485 | Schroeder | Feb. 19, 1952 |
| 2,740,543 | Moundson | Apr. 3, 1956 |